J. F. BOWER.
WATERING TROUGH.
APPLICATION FILED JAN. 31, 1914.
1,112,971.
Patented Oct. 6, 1914.
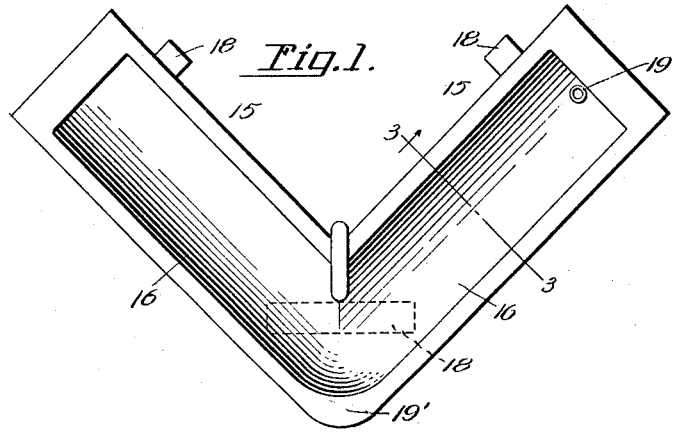
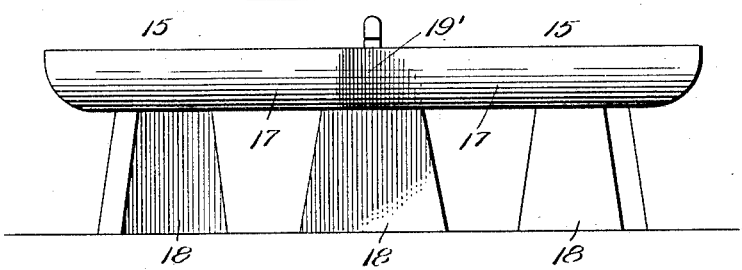
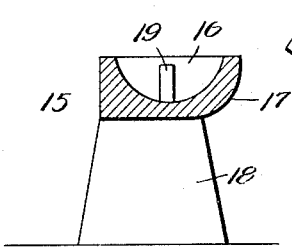
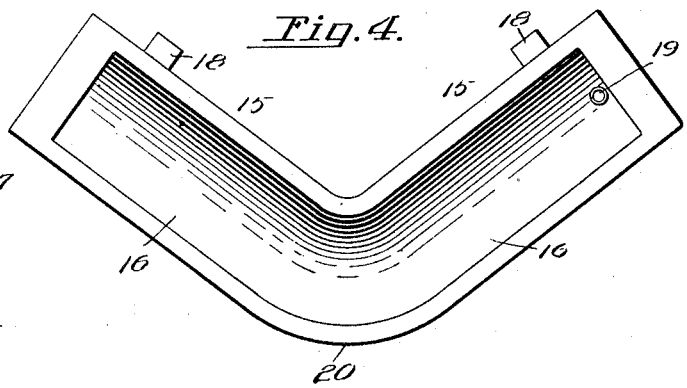
Inventor
John F. Bower.
Witnesses
F. C. Gibson.
By Victor J. Evans
Attorney

UNITED STATES PATENT OFFICE.

JOHN F. BOWER, OF WILLIAMSPORT, PENNSYLVANIA.

WATERING-TROUGH.

1,112,971. Specification of Letters Patent. Patented Oct. 6, 1914.

Application filed January 31, 1914. Serial No. 815,780.

*To all whom it may concern:*

Be it known that I, JOHN F. BOWER, a citizen of the United States, residing at Williamsport, in the county of Lycoming and State of Pennsylvania, have invented new and useful Improvements in Watering-Troughs, of which the following is a specification.

This invention relates to watering troughs and has for its object to produce a watering trough of angular shape which may be readily approached by teams coming from any direction and which will permit of being simultaneously used by several animals abreast or coming from opposite directions.

A further object of the invention is to produce an angular watering trough which if subjected to the impact of the tongue of a heavy truck or vehicle will deflect such tongue laterally so that no injury will occur.

A further object of the invention is to produce a simple, efficient, inexpensive and thoroughly useful watering trough which, without occupying much room, will be capable of simultaneously accommodating a number of animals.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawing,—Figure 1 is a top plan view showing a simple and preferred construction of the improved watering trough. Fig. 2 is a front view of the same. Fig. 3 is a sectional detail view taken on the line 3—3 in Fig. 1. Fig. 4 is a top plan view illustrating a modification in the form of the trough.

Corresponding parts in the several figures are denoted by like characters of reference.

In the form of the invention shown in Fig. 1, the trough is of angular shape, comprising two wings 15 which are disposed substantially at right angles to each other, although I will have it understood that the angle between the wings may be considerably varied, say, between 75 and 120 degrees, more or less. The trough may be constructed of any material such as wood, stone, artificial or natural, metal or of any combination of materials desired. The wings of the trough are suitably concaved or hollowed, as seen at 16, and the outer faces 17 of the wings are preferably curved downwardly and inwardly, as best seen in Fig. 3. Supports 18 may be used to elevate the trough to a proper height. The wings of the troughs may be slanted in any direction and provided at their lower ends with waste plugs 19 to facilitate emptying and cleansing when desired; the trough may be supplied in any convenient manner or from any suitable source, not shown. The outer angle of the trough is preferably thickened or reinforced, as seen at 19′, in order that it may resist any blows to which it may be subjected by the tongues of vehicles or the like.

Under the modified construction shown in Fig. 4, the angles of the trough have been rounded, as seen at 20, so that the trough will present an arcuate instead of an angular appearance, but the principle remains the same.

Drinking troughs or watering troughs for horses are usually placed in the street lengthwise along the gutter or the sidewalk, or at the side of a road, as the case may be, and drivers in order to water their teams are compelled to make a half turn to squarely approach the trough, resulting frequently in blocking the road by having the wagon or vehicle extend transversely across the same. With the improved watering trough this becomes unnecessary, since teams approaching from opposite directions may drive up to the wings of the trough, permitting several teams to be watered simultaneously and without interference, the wagons or vehicles being positioned lengthwise of the road and capable of leaving the trough without interference. In approaching the trough, if the tongue of a truck or vehicle should strike either one of the wings, it will be deflected laterally owing to the relatively slanting position of the wings of the trough; it will also be deflected downwardly owing to the arcuate form of the front of each wing. Should the angle of the trough be severely hit it will be found capable of resisting the impact owing to the reinforced portion shown at 19.

Having thus described the invention, what is claimed as new, is:—

1. A road-side watering trough comprising a trough-shaped body of angular form presenting independent sections divergent from an intermediate point, said intermediate point adapted to project in the direction of the middle of the road and the outer faces of the independent sections being presented obliquely in the paths of teams approaching from opposite directions.

2. A road-side watering trough comprising a trough-shaped body open from end to end and including angularly related portions adapted to lie obliquely in the paths of teams approaching from opposite directions so that the tongues of vehicles striking the angular faces of the trough will be deflected outwardly without injury.

In testimony whereof I affix my signature in presence of two witnesses.

JOHN F. BOWER.

Witnesses:
WM. H. McCLARIN,
JACOB W. SHOOK.

---

Copies of this patent may be obtained for five cents each, by addressing the "Commissioner of Patents, Washington, D. C."